United States Patent [19]

Richter et al.

[11] Patent Number: 4,656,228
[45] Date of Patent: Apr. 7, 1987

[54] POLYAMIDES HAVING HIGH NOTCHED IMPACT STRENGTH AND HIGH FLUIDITY IN THE MOLTEN STATE

[75] Inventors: Wolfgang Richter; Hans-Josef Buysch; Bert Brassat, all of Krefeld; Josef Merten, Korschenbroich; Heinrich Haupt, Krefeld, all of Fed. Rep. of Germany

[73] Assignee: Bayer Aktiengesellschaft, Leverkusen, Fed. Rep. of Germany

[21] Appl. No.: 814,671

[22] Filed: Dec. 30, 1985

Related U.S. Application Data

[63] Continuation of Ser. No. 731,053, May 6, 1985, abandoned, which is a continuation of Ser. No. 647,451, Sep. 5, 1984, abandoned.

[30] Foreign Application Priority Data

Sep. 17, 1983 [DE] Fed. Rep. of Germany ....... 3333723

[51] Int. Cl.$^4$ .............................................. C08L 69/00
[52] U.S. Cl. .................................................... 525/433
[58] Field of Search ......................................... 525/433

[56] References Cited

U.S. PATENT DOCUMENTS 3,544,524 12/1970 Muller et al. .
4,369,285 1/1983 Sanderson et al. .

FOREIGN PATENT DOCUMENTS 0023667 2/1981 Fed. Rep. of Germany .

Primary Examiner—John C. Bleutge
Assistant Examiner—A. L. Carrillo
Attorney, Agent, or Firm—Connolly & Hutz

[57] ABSTRACT

Unfilled, unreinforced polyamide moulding compounds are disclosed which have high rigidity and notched impact strength and are highly fluid in the molten state, containing aliphatic polycarbonate polyurethanes which are substantially unbranched in the carbon chain, prepared from polyhexamethylene carbonate diols and/or mixtures thereof with oligo- or polyalkylene glycols having 4–100 carbon atoms and 1,6-diisocyanatohexane.

7 Claims, No Drawings

POLYAMIDES HAVING HIGH NOTCHED IMPACT STRENGTH AND HIGH FLUIDITY IN THE MOLTEN STATE

This is a continuation of application Ser. No. 731,053 filed May 6, 1985, now abandoned, which in turn is a continuation of application Ser. No. 647,451 filed Sept. 5, 1984, now abandoned.

The present invention relates to unfilled, unreinforced polyamide moulding compounds which have high rigidity and notched impact strength and are highly fluid in the molten state, containing aliphatic polycarbonate polyurethanes which are substantially unbranched in the carbon chain, prepared from polyhexamethylene carbonate diols and/or mixtures thereof with oligo- or polyalkylene glycols having 4–100 carbon atoms and 1,6-diisocyanatohexane.

Freshly extruded, partially crystalline polyamides attain their maximum toughness only after they have been conditioned by absorption of water.

In order to shorten the time required for the natural conditioning of partially crystalline polyamides effected by atmospheric moisture and in order to obtain optimum properties from the beginning, it is advantageous to treat the finished polyamide moulded articles with warm water in an immersion vat for a period varying from several hours to days according to the thickness of the material, until they have absorbed about 3% of water. This 3% of water content corresponds to the water absorption at 50% relative humidity. It is generally necessary to follow this treatment by prolonged storage in a moist atmosphere in order to ensure that the water molecules which have penetrated the surface are uniformly distributed within the whole moulded piece.

It is evident from this that considerable investement costs and consumption of time and energy are required, particularly from large pieces or large quantities of articles.

There have therefore been attempts to obtain partially crystalline polyamides with high impact strength immediately after their extrusion by means of low molecular weight or macromolecular modifications without the expensive process of conditioning with water. The low molecular weight plasticizers used have been (di)carboxylic acid ester such as stearic acid octyl ester, p-hydroxybenzoic acid esters (JA No. 48-60750), phthalic acid dioctyl esters or benzoic acid ethyl esters (DOS No. 1,912,111), phenolic compounds such as 4-nonylphenol or 4-methyl-2,6-ditert.-butylphenol (DOS No. 1,912,111) or mixtures of these two classes of compounds. It is also known to improve the notched impact strength of polyamides by means of N-methylpyrrolidone (DOS No. 1,911,468) and N-methylbenzenesulphonamide. These have provided the additional desirable effect of lowering the melt viscosity and enabling the material to be injected into fine cavities and from a considerable distance.

One disadvantage of polyamides containing plasticizers, however, is their low rigidity. A polyamide to which about 10% of N-methyl-benzene sulphnamide has been added has a tensile-E-modulus of only 1040 MPa as compared with the value of 3000 MPa obtained in an unmodified polyamide.

Another decisive disadvantage of low molecular weight plasticizers is the fact that they bleed out in the course of time so that the surface becomes marred and the properties change due to this migration. Attempts at improvements have therefore concentrated mainly on finding high molecular weight notched impact strength modifiers.

Thus polyethylenes and ethylene-vinyl acetate copolymers have been recommended for improving the notched impact strength (JA No. 52-104 567). Such blends however, have the disadvantage of leading to white fractures due to the incompatibility of the copolymer with polyamides. Furthermore, the fluidity of such modified polyamides is drastically reduced.

The same phenomena are also observed when ethylene copolymers are used for modification, as disclosed for example in DOS No. 2 011 608.

Polyurethanes, including thermoplastic polyurethanes obtained from aliphatic polycarbonates, have been described in DOS 2 931 689 for improving the toughness of reinforced polyamides.

When the polycarbonate urethanes described therein are used for modifying unreinforced, unfilled polyamides, the moulded products produced from then are found to have faulty areas or in some cases the moulded compounds cannot be thermoplastically processed at all.

Furthermore, chain degradation may occur without improvement in the fluidity. This is observed, for example, when a polyurethane of polyhexamethylene carbonate, polypropylene glycol, diphenylmethane-4,4'-diisocyanate and butane-1,4-diol is used for the modification of unreinforced or unfilled polyamide.

It has now surprisingly been found that polycarbonate urethanes prepared from (1) polyhexamethylene carbonate diols or mixtures thereof with oligo- or polyalkylene glycols having 4–100 carbon atoms and (2) 1,6-diisocyanatohexane as modifiers can be used for unreinforced, unfilled polyamides without the disadvantages just described.

The polyamide moulding compounds obtained under these conditions are virtually undiminished in their rigidity compared with unmodified polyamide while their notched impact strength and fluidity are improved.

The present invention therefore provides unfilled, unreinforced thermoplastic polyamide moulding compounds obtained from (I) 98–70% by weight, preferably 95–80% by weight, based on components I and II, of a partially crystalline polyamide; and (II) 2–30% by weight, preferably 5–20% by weight, based on components I and II, of an aliphatic polycarbonate urethane which is substantially unbranched in the carbon chain and which has been prepared from polyhexamethylene carbonate diols or mixtures thereof with oligo- or polyalkylene glycols having 4–100 carbon atoms and from 1,6-diisocyanatohexane.

The substances used as component II are preferably polycarbonate urethanes prepared from mixtures of 100 to 40% by weight, preferably 100 to 55% by weight, most preferably 90 to 55% by weight of polyhexamethylene carbonate diols and 0 to 60% by weight, preferably 0 to 45% by weight, most preferably 10 to 45% by weight of oligo- or polyalkylene glycols having 4 to 100 carbon atoms and 1,6-diisocyanatohexane.

The partially crystalline polyamides used are polyamide-6, -11 or -12 or conventional polycondensates of diamines and dicarboxylic acids, such as 6,6- and 6,10-polyamide or mixtures thereof. It is preferred to use 6- and 6,6-polyamide.

Polyhexamethylene carbonate diols are prepared from hexane-1,6-diol and carbonic acid esters, chloroformic acid esters or phosgene by methods known from the literature [e.g. J. Amer. Chem. Soc. 80, 4596 (1958), J. Amer. Soc. 55, 5031 (1933), J. Amer. Chem. Soc. 52, 314 (1930), Houben-Weyl, Methoden der Org. Chemie, Vol. VIII, page 106 et seq, 109 (1952)] and they have molecular weights (Mn) of from 260 to 20,000, preferably from 260 to 10,000, in particular from 260 to 6000 (determined by OH group determination or gel chromatography).

Oligo- and polyalkylene glycols with 4 to 100 carbon atoms suitable for the purpose of this invention include, for example, di-, tri-, tetra- and octaethylene glycols, polyethylene glycols, polypropylene glycols, polyethylene/propylene glycols and polytetrahydrofurans.

Aliphatic polycarbonate urethanes which are substantially unbranched in the carbon chain may contain up to 10%, preferably only up to 5% of branched side chains. Such aliphatic polycarbonate urethanes are formed in the course of polyaddition by a reaction of the urethane groups already formed with isocyanate groups or they may be formed when part of the polyhexamethylene carbonate diol is replaced by branched chain polyhexamethylene carbonates and/or when a proportion of the polyether diol is replaced by branched chain polyalkylene glycols.

Branch chain polyalkylene glycols may be prepared by known methods from alchols which are at least trihydric, such as trimethylolpropane, pentaerythritol, ethylene oxide or propylene oxide.

Branch chain polyhexamethylene carbonates are obtained when alcohols which are at least trihydric, such as trimethylolpropane or pentaerythritol, are added during the condensation of hexane-1,6-diol with carbonic acid esters, chloroformic acid esters or phosgene.

The polycarbonate urethanes used according to the invention may be prepared from the indicated diols and 1,6-diisocyanatohexane by methods known from the literature (e.g. O. Bayer, Angew, Chem. 59, 257 et seq (1947)) and they should have molecular weights (Mw) of from 1000 to 100,000, preferably from 2000 to 90,000, in particular from 5000 to 85,000, determined by gel chromatography or light scattering in dimethylformamide.

Incorporation of the modifier is carried out at temperatures above the melting point of the polyamide used, preferably at temperatures of from 200° to 300° C., in particular from 240° to 290° C., using known mixing apparatus such as extruders, kneaders, static mixers, etc. In addition, the usual unfilled and unreinforced additives such as lubricants and mould release agents, nucleating agents, pigments, dyes, stabilizers, crystallization accelerators and antistatic agents may be added to the polyamides. Modified polyamides of this type may readily be injection moulded and the resulting moulded products are distinguished by their good surface quality and improved notched impact strength together with high rigidity. Separation of polymer components occurs neither in the finished article nor in the melt.

It has further more surprisingly been found that the injection moulded products are uniformly crystallized throughout, with a spherulite size of less than 1μ. The high isotropic crystallinity of the material after injection moulding ensures that the moulded products obtained do not undergo distortion due to subsequent crystallization (spherulite formation). Moreover, the readiness with which the polyamides undergo crystallisation and hence the ease with which the resulting products can be removed from the mould provide the added advantage of rapid injection moulding cycles.

The polyamide moulding compounds according to the present invention may be worked up into products which are very tough in the freshly moulded state and they are therefore suitable, for example, for the production of protective helmets since these are required to be produced from an exceptionally highly fluid thermoplastic injection moulding material on account of the high ratio of their surface area to wall thickness and must in addition, for safety reasons, have high lateral rigidity and high impact strength and notched impact strength in the freshly moulded state. The percentages given in the examples are percentages by weight.

Polyurethane carbonate A 1068 g (0.5 mol*) of polyhexamethylene carbonate ($M_N=2138$; OH number 52.5) are homogeneously mixed at 80° C. with 150 g (0.25 mol) of an ethylene oxidepolyether diol ($M_N=600$; primary OH $\geq 90\%$) which has been started with propylene glycol, and 117.7 g (0.7 mol) of 1,6-diisocyanatohexane are added with stirring over a period of 1 hour 40 minutes. The mixture is left to react for a further 2 hours at 84° to 94° C. in order to complete the reaction. When cold the product is granulated in a mill.

Melting range: 45° to 50° C.
Molecular weight (Mw): 29 800.

* By "mol" of the polydisperse system is meant:

$$mol = \frac{mol \text{ of OH groups}}{functionality \text{ of the polymer}} = \frac{OH \text{ number} \times \text{weight in kg}}{56.11 \times functionality}$$

The functionality of the polyhexamethylene carbonate used is 2.

Polycarbonate urethane B 1282 g (0.6 mol*) of polyhexamethylene carbonate ($M_N=2138$, OH number: 52.5) are homogeneously mixed at 80° C. with 90 g (0.15 mol) of an ethylene oxidepolyether diol ($M_N=600$; primary OH $\geq 90\%$) which has been started with propylene glycol, and 58.8 g (0.25 mol) of 1,6-diisocyanatohexane are added with stirring over a period of 70 minutes. The reaction mixture is then heated to 80° C. for 3.5 hours to complete the reaction. When cold, the product is granulated in a mill.

Melting range: 53° to 58° C.
Molecular weight (Mw): 8600

Polycarbonate urethane C 1282 g (0.6 mol*) of polyhexamethylene carbonate are homogeneously mixed with 233 g (1.2 mol) of tetraethylene glycol at 80° C. and 291.5 g (1.73 mol) of 1,6-diisocyanatohexane are added over a period of 100 minutes with stirring. The reaction mixture is then heated to 85° C. for 4 hours to complete the reaction. When cold, the product is granulated in a mill.

Melting range: 80° to 90° C.
Molecular weight (Mw): 35 700

Polycarbonate urethane D 854.8 g (0.4 mol*) of polyhexamethylene carbonate ($M_N32$ 2138; OH number: 52.5) are homogeneously mixed with 400 g (0.2 mol) of a polypropylene glycol $M_N=2000$, sec. OH$\geq 97\%$) at 80° C. and 92.5 g (0.55 mol) of 1,6-diisocyanatohexane are added with stirring over a period of 1.5 hours. The reaction mixture is then heated to 90°-122° C. for 4 hours to complete the reaction (no NCO left to titrate). When cold, the product is granulated in a mill.

Melting range: 60° to 70° C.

Molecular weight (Mw): 82 200

Polycarbonate urethane E 1068 g (0.5 mol*) of polyhexamethylene carbonate ($M_N$=2138; OH number: 52.5) are added to 740 g (2 mol) of polyethylene glycol (mixture of octaethylene glycol homologues) and homogenized at 75° C. 406.5 g (2.42 mol) of 1,6-diisocyanatohexane are added dropwise at 78° to 108° C. over a period of 2 hours with stirring. The mixture is left for a further 3 hours at about 120° C. to complete the reaction. When cold, the product is granulated in a mill.

Melting range: 100° to 120° C.
Molecular weight (Mw): 51 800

Polycarbonate urethane F 249.2 g (1.48 mol) of 1,6-diisocyanatohexane are added dropwise to 1000 g (1.52 mol) of hexanediol polycarboate ($m_N$=656, OH number 171) at 76° to 80° C. over a period of 105 minutes with stirring. The mixture is left to react for a further 5 hours at 86° C. until no more free isocyanate groups can be titrated. When cold, the reaction product is granulated in a mill.

Melting range: 55° to 65° C.
Molecular weight (Mw): 20 600

EXAMPLES 1-6

Mixtures of 90% by weight of polyamide 6 and 10% by weight of the polycarbonate urethanes shown in Table 1 were homogenized at 250° C., using a double shaft screw extruder, Model ZSK 53 of Werner and Pfleiderer. The extruded strand was spun in a water bath and granulated and the granulate was dried in a vacuum at 80° C. and then injection moulded to form test samples. Table 1 gives a summary of the properties of the modified polyamides in comparison with the values for unmodified PA-6.

It may be seen from Table 1 that the modifiers used according to this invention result in polyamides having substantially higher notched impact strength together with long flow lengths and virtually undiminished rigidity without any loss in the $n_{rel}$ viscosity.

TABLE 1

| Examples | | | 1 | 2 | 3 | 4 | 5 | 6 |
|---|---|---|---|---|---|---|---|---|
| | Polyamide-% by weight | 100% by weight | 90 | 90 | 90 | 90 | 90 | 90 |
| | Polycarbonate urethane/% by weight | — | A/10 | B/10 | C/10 | D/10 | E/10 | F/10 |
| DIN 53 453 | Notched impact strength (freshly moulded) $a_K$ kJ/m$^2$ | 3.2 | 9.3 | 9.4 | 9.4 | 8.7 | 12.4 | 12.3 |
| DIN 52 457 | Tensile-E-modulus (freshly moulded) GP a | 2.47 | 2.36 | 2.44 | 2.34 | 2.51 | 2.35 | 2.37 |
| * | Flow length cm | 35 | 61 | 57 | 50 | 60 | 55 | 58 |
| | rel. viscosity $\eta_{rel}$** | 3.82 | 3.84 | 3.68 | 3.96 | 3.67 | 3.86 | 3.92 |

*The flow length is a measure of the fluidity of polyamide melts. It is determined by spraying a spiral tool (spiral: 1000 mm × 4 mm × 2.5 mm) (heated to 90° C.) from the middle thereof with the polymer melt (260° C.) under a pressure of 72 bar. The path covered by the melt under the conditions, measure in cm, is defined as the flow length.

**$\eta_{rel}$ determined on a 1% solution in m-cresol at 25° C.

We claim:

1. An unfilled, unreinforced thermoplastic moulding compound obtained from
   (I) 98 to 70% by weight of a partially crystalline polyamide; and
   (II) 2 to 30% by weight of an aliphatic polycarbonate urethane substantially unbranched in the carbon chain, prepared from polyhexamethylene carbonate diol or a mixture thererof with an oligo- or polyalkylene glycol having 4 to 100 carbon atoms and from 1,6-diisocyanathohexane.

2. A thermoplastic moulding compound according to claim 1 obtained from 95 to 80% by weight of component I and 5 to 20% by weight of component II percentages being based on the sum total of components I and II.

3. A thermoplastic moulding compound according to claim 1, wherein component II has a molecular weight or from 1000 to 100,000.

4. A thermoplastic moulding compound according to claim 3, wherein component II has a molecular weight of from 2000 to 90,000.

5. A thermoplastic moulding compound according to to claim 1 wherein component II has been prepared from a mixture of 100 to 40% by weight of a polyhexamethylene carbonate diol and 0 to 60% by weight of an oligo- or polyalkylene glycol having 4 to 100 carbon atoms and 1,6-diisocyanatohexane.

6. A thermoplastic moulding compound according to claim 5, wherein component II has been prepared from a mixture of 90 to 55% by weight of a polyhexamethylene carbonate diol and 10 to 45% by weight of an oligo- or polyalkylene glycol having 4 to 100 carbon atoms and 1,6-diisocyanatohexane.

7. A thermoplastic moulding compound according to claim 1, wherein the partially crystalline polyamide I is 6- or 6,6-polyamide.

\* \* \* \* \*